United States Patent [19]

Moorwessel et al.

[11] 3,980,598

[45] Sept. 14, 1976

[54] MIXTURES BASED ON ETHYLENE COPOLYMERS AND ASPHALT

[75] Inventors: Dieter Moorwessel, Mannheim; Rudolf Glaser, Ludwigshafen; Günther Pfirrmann, Ludwigshafen; Rudolf Konopka, Ludwigshafen, all of Germany

[73] Assignee: BASF Aktiengesellschaft, Ludwigshafen (Rhine), Germany

[22] Filed: Aug. 21, 1975

[21] Appl. No.: 606,442

[30] Foreign Application Priority Data

Aug. 28, 1974 Germany..................................24412/03

[52] U.S. Cl...................... 260/28.5 AS; 260/42.43; 260/42.52
[51] Int. Cl.$^2$.......................................... C08L 91/00
[58] Field of Search.............. 260/28.5 AS, 28.5 AV

[56] References Cited
UNITED STATES PATENTS

| | | | |
|---|---|---|---|
| 3,177,164 | 4/1965 | Mills et al. ............. | 260/28.5 AS UX |
| 3,869,417 | 3/1975 | Ramsay....................... | 260/28.5 AS |

FOREIGN PATENTS OR APPLICATIONS 1,298,282    6/1969    Germany..................... 260/28.5 AS

*Primary Examiner*—Lewis T. Jacobs
*Attorney, Agent, or Firm*—Johnston, Keil, Thompson & Shurtleff

[57] ABSTRACT

Mixtures of asphalt and ethylene copolymers, in which asphalts from solvent extraction processes are used as asphalt. Compared to conventional molding materials comprising mixtures of straight-run asphalts and ethylene polymers, the compositions according to the invention show no exudation of oil. The molding materials may be converted to sheeting and be used in roofing, as container lining or as pipe coating.

7 Claims, No Drawings

MIXTURES BASED ON ETHYLENE COPOLYMERS AND ASPHALT

The invention relates to ethylene copolymer/asphalt mixtures which contain asphalts from solvent extraction (precipitation) processes.

It is well known that purely bituminous molding materials soften at even slightly elevated temperatures and flow, under load, even at relatively low temperatures. Molded structures of various asphalts withstand tensile forces only briefly, if at all.

It has been disclosed that polyolefins, and especially polyethylenes, may be mixed with asphalt in any proportions. The creep of the molding materials thus obtained decreases with increasing polyethylene content. Even a small proportion of polyethylene greatly reduces the creep of the molding materials and improves their elastic behavior. Molding materials based on mixtures of asphalt and polyethylene, optionally also containing up to about 50 per cent by weight of mineral fillers, are used, e.g., to manufacture accumulator boxes, as cable-embedding compositions and for insulating electrical contacts. The adhesion and elongation at break of purely bituminous molding materials or of conventional molding materials based on mixtures of asphalt and polyethylene is however not fully satisfactory.

German Printed Application No. 1,298,282 discloses mixtures of asphalt and ethylene copolymers, in which special copolymers of ethylene and vinyl esters and/or copolymerizable acrylic and/or methacrylic compounds are employed. The asphalt used in these mixtures is straight-run and has a penetration of from 10 to 210 according to DIN 1,995. Such molding materials have greatly improved elasticity and greatly increased elongation at break compared to purely bituminous molding materials and to molding materials based on mixtures of asphalt and polyethylene. Furthermore, they are easier to process and adhere very much better to conventional inorganic materials, such as metals, concrete and masonry. Even though these molding materials are used extensively because of their good mechanical properties, they have the serious disadvantage that oil exudes during storage. This effect reduces the shelf life of the granules and their granular flow when converting them to shaped articles, e.g. membranes used in building. The coat of oil is also objectionable when handling finished articles made from such molding materials, for example when laying membranes.

It has already been proposed to reduce this exudation of oil by admixture of additives which inhibit oil migration with the molding materials in question. However, large amounts of these additives must normally be added and these greatly detract from the mechanical properties of such molding materials. The use of straight-run asphalt of low penetration and hence of lower oil content, or of blown asphalt, in such molding materials only slightly reduces oil exudation in practice.

Attempts have also already been made to use high-vacuum asphalt, which contains substantially less oil, in place of conventional straight-run asphalt. Whilst the molding materials thus produced exhibit very little exudation of oil, they have substantially poorer mechanical properties than the molding materials based on straight-run asphalt and ethylene copolymers. In particular, their elongation at break is too low and their stiffness too great, so that, e.g., they are unsuitable for use as membranes for building.

In addition, it is known that high-vacuum asphalt is difficult to pump, because of its high viscosity, and mixing such asphalt with the ethylene copolymers on a production scale in conventional mixing apparatus presents very great difficulty.

It is an object of the present invention to provide mixtures of ethylene copolymers and asphalt which show the above disadvantages to a much lesser degree than the conventional molding materials of this type, if at all. In particular, it is an object of the invention to avoid the exudation of oil without thereby impairing the good mechanical properties of the molding materials.

We have found that this object is achieved by using as the asphalt component an asphalt obtained by a deasphalting process.

Accordingly, the invention relates to mixtures of ethylene copolymers and asphalt and, optionally, conventional additives, which contain from 3 to 97 per cent by weight of ethylene copolymer (preferably from 30 to 70 per cent by weight) and from 97 to 3 per cent by weight of asphalt (preferably from 30 to 70 per cent by weight), based on the ethylene copolymer/asphalt mixtures, wherein the asphalt used is a precipitated asphalt having a penetration, measured according to DIN 1,995, of less than 10 at 25°C.

Compared to the conventional molding materials based on mixtures of ethylene polymers and straight-run asphalt, the molding materials according to the invention show virtually no exudation of oil. The molding materials are easy to process and their mechanical properties are not inferior to comparable molding materials based on mixtures or ethylene copolymers and straight-run asphalt. On the contrary, the molding materials according to the invention frequently have substantially better mechanical properties, in particular improved tensile strength and elongation at break. These properties are the more surprising, since it is known that the special asphalts to be employed according to the invention, namely those obtained by a deasphalting process, do not have the properties required for asphalt used as, e.g., a building material (cf. W. Georgy, "Die Baustoffe Bitumen und Teer," Köln-Braunsfeld: Rudolf Muller (1963), page 41) and molding materials based on ethylene copolymers and high vacuum asphalt, which is also a thoroughly deoiled asphalt, also have unsatisfactory mechanical properties.

The terms straight-run asphalt, high-vacuum asphalt and precipitated (extracted) asphalt used in the present specification relate to the conditions of manufacture which substantially influence the composition and properties of the asphalt. By straight-run asphalt we mean soft to medium-hard grades obtained on gentle distillation of petroleum. High-vacuum asphalt is very hard and brittle, of low oil content, obtained on distillation under a particularly high vacuum. Precipitated asphalts consist of distillation residues, of low oil content, which are obtained by conventional processes. They have a higher resin content than straight-run asphalt. The preferred solvent used in the extraction process is furfurol. In deasphalting, propane, butane, pentane and their mixtures may in particular be used. Precipitated asphalts are greatly deoiled compared to straight-run material and are therefore very brittle and hard and have a low penetration value. However, by virtue of their viscosity at 150°C they can be pumped easily compared to high-vacuum material and are therefore easily processable. The precipitated asphalt suitable for the mixtures according to the invention, having a penetration, measured according to DIN 1,995, of less than 10° at 25°C, in general has a softening point of from 40° to 110°C, measured according to DIN 1,995 (ring-and-ball method). Precipitated asphalts having a penetration of from 0 to 8 and a softening point of from 50° to 85°C are preferred. The penetration is the depth, in tenths of a millimeter, to which a standard needle penetrates into asphalt under the conditions specified in DIN 1,995.

The ethylene copolymers suitable for use in the molding materials may be manufactured by conventional methods, e.g., by the high pressure polymerization process at pressures above 1,000 atmospheres, i.e. in general at pressures of from 1,000 to 3,000 atmospheres, or by solution or emulsion polymerization processes in aqueous dispersion at pressures from about 100 to 400 atmospheres. They generally contain from 3 to 70 per cent by weight, preferably from 10 to 50 per cent by weight, based on ethylene copolymer, of copolymerized comonomer units. Copolymers of ethylene and vinyl esters and/or copolymerizable acrylic and/or methacrylic compounds are preferred. Suitable vinyl esters for use in the copolymers are, in particular, vinyl acetate and vinyl propionate. Suitable acrylic and methacrylic compounds are, e.g., acrylic acid and methacrylic acid and their esters, particulary with straight-chain or branched alkanols of 1 to 10 carbon atoms, and the (optionally nitrogen-substituted) amides, and nitriles, of these acids. Specific examples are the methyl, propyl, n-butyl and i-butyl, cyclohexyl and 2-ethylhexyl esters of acrylic acid or methacrylic acid, acrylamide, methacrylamide, N-methylacrylamide, N-ethylmethacrylamide, acrylonitrile and methacrylonitrile. The ethylene copolymers suitable for use in the molding materials may contain only one or more vinyl esters or only one or more acrylic and/or methacrylic compounds as copolymerized units. However, copolymers which contain both vinyl esters and acrylic and/or methacrylic compounds of the above type as copolymerized units are also suitable. Furthermore, mixtures of ethylene copolymers of the above type may also be used in the molding materials. Molding materials which contain copolymers of ethylene with from 10 to 50 per cent by weight of alkyl acrylates, especially butyl acrylate, have very particularly advantageous properties.

In general, the copolymers which may be used for the molding materials have melt indices of from 0.1 to 100; copolymers with melt indices of from 0.1 to 20 are preferred.

The molding materials may be manufactured by conventional methods, by mixing the ethylene copolymers and the precipitated asphalt, e.g. in stirred mixers, extruders or mills.

The new molding materials are outstandingly suitable for all applications for which the conventional molding materials based on ethylene copolymers and straight-run asphalt already find use. Thus, the new molding materials can readily be converted to membranes and sheets which can be used for covering and sealing roofs, lining containers and coating pipes. The molding materials can also be applied in the fused state, and in practically any thickness, to shaped articles, e.g. by brushing or floating. In such cases it is advantageous to warm the surface of the shaped article which is to be coated, to temperatures which approximately correspond to the temperature of the hot molding material. It may also be of advantage first to apply a primer, e.g. an asphalt emulsion, to the surfaces which are to be coated.

Furthermore, floor coverings may be produced from the molding materials, e.g. by casting, and joints or cracks in buildings or road surfaces can be sealed. In addition, the molding materials can be processed by conventional methods, e.g. on extruders, injection molding machines and presses, to give shaped articles such as pipes, hoses, profile strips, seals, housing components and containers. Shaped structures made from the molding materials can easily be bonded to one another by melting the surfaces (e.g. when welding roof membranes with hot air).

The molding materials can also be used to manufacture castings, and to protect various articles against corrosion by dipping them in the molten materials, as well as for the manufacture of elastic corrosion-protection wraps for pipelines.

Conventional fillers, e.g. wood flour, carbon black, infusorial earth, kaolin, quartz powder, rock chips, sand, glass fibers and slag wool, as well as rubber powder, wool felt, jute or synthetic fibers, e.g. in particle sizes of about 0.01 to 0.09 mm, may be added to the molding materials. The proportion of these particulate fillers may in general vary within wide limits, and is in general from about 5 to 70 per cent by weight, based on the total molding material.

Molding materials which in addition to particulate mineral fillers of the above type also contain mineral fillers of particle size greater than 0.09 mm and up to 20 mm, e.g. sand and rock chips, may be used with particular advantage for the manufacture of cast or rolled shaped articles, and for the production of road surfacings and flooring slabs.

Molding materials which contain fibrous fillers, e.g. glass fibers, asbestos, slag wool, wool felt, jute and/or synthetic fibers, optionally together with mineral fillers of the above type, have particularly high resistance to creep.

The parts in the examples which follow are by weight. The penetration and the softening point (ring-and-ball method) of the asphalts used were determined in accordance with DIN 1,995.

The oil exudation of the molding materials was measured by means of the oil migration test. For this test, sheets of size 40 × 40 × 1.5 mm were pressed from the molding materials and then stored under a load of 1 kg for 20 days between filter papers at room temperature. The amount of oil taken up by the filter paper, which was determined visually from the coloration of the filter paper, was used to assess the oil exudation. The rating shown in Table 1 was made in relation to a color scale ranging from white (no discoloration) to dark brown.

TABLE 1

| Rating | Coloration | Oil exudation |
|---|---|---|
| 1 | white | none |
| 2 | pale brownish | slight |
| 3 | light brown | medium |
| 4 | brown | severe |
| 5 | dark brown | very severe |

The tensile strength, elongation at break and G-modulus were determined in accordance with DIN 53,455 and DIN 53,445.

EXAMPLE 1

50 parts of a copolymer of 80 parts of ethylene and 20 parts of n-butyl acrylate, which has been manufactured by conventional methods at a pressure of above 1,000 atmospheres and had a melt index of 1.5, are mixed, in accordance with the invention, with 50 parts of precipitated bitumen at about 160°C in a conventional kneader. This rapidly gives a homogeneous molding material.

Similar mixtures were prepared for comparison purposes, with the precipitated asphalt being replaced, in one case, by a straight-run grade (Comparative Experiment A) and in the other by a high-vacuum grade (Comparative Experiment B). The characteristic data of the asphalts employed are summarized in Table 2.

TABLE 2

| Asphalt | Precipitated asphalt | Straight-run asphalt | High-vacuum asphalt |
|---|---|---|---|
| Penetration at 25°C (1/10 mm) | 2 | 76 | 1 |
| Softening point (ring and ball) (°C) | 72 | 48 | 140 |
| Asphaltenes (% by weight) | 8.5 | 10.5 | 38 |
| Viscosity at 150°C (cSt) | 690 | 330 | — |

The oil exudation, the G-modulus, the tensile strength and the elongation at break were determined for all the molding materials. The values found are shown in Table 3.

TABLE 3

| Properties | Example according to the invention | Comparative Example A | Comparative Example B |
|---|---|---|---|
| Oil exudation | 1 | 5 | 2 |
| Modulus of shear G at 23°C (N/mm²) | 15 | 8 | 25 |
| Tensile strength at 23°C (N/mm²) | 7 | 3.9 | 4 |
| Elongation at break, 23°C (%) | 1,038 | 730 | 580 |

EXAMPLE 2

50 parts of a precipitated asphalt which has a penetration of 2 and a softening point of 72°C (ring and ball) are mixed in a conventional kneader, at 160°C, with 50 parts of a copolymer of 70 parts of ethylene and 30 parts of butyl acrylate, which has been manufactured by conventional methods at a pressure of above 1,000 atmospheres and has a melt index of 0.5. A homogeneous molding material is obtained very rapidly; it shows no exudation of oil and has a G-modulus of 4.0, a tensile strength of 7.9 and an elongation at break of 1,090.

EXAMPLE 3

50 parts of the precipitated asphalt used in Example 1 are mixed with 30 parts of an ethylene copolymer which contains 70% of ethylene and 30% of butyl acrylate as copolymerized units, and 20 parts of a copolymer which contains 80 per cent by weight of ethylene and 20 per cent by weight of n-butyl acrylate as copolymerized units. The molding material shows no exudation of oil; it has a G-modulus of 7.3, a tensile strength of 8.1 and an elongation at break of 1,064.

EXAMPLE 4

60 parts of the precipitated asphalt used in Example 1 are mixed in a kneader, at 150°C, with 40 parts of a copolymer of 70 parts of ethylene and 30 parts of n-butyl acrylate, which has been manufactured by conventional methods and has a melt index of 0.5. A homogeneous molding material is obtained rapidly; it shows no exudation of oil, and has a G-modulus of 4.0, a tensile strength of 6.9 and an elongation at break of 1,165.

EXAMPLE 5

50 parts of a precipitated asphalt which has a penetration of 5 and a softening point of 60°C (ring and ball) are mixed with 30 parts of an ethylene copolymer which contains 70% of ethylene and 30% of butyl acrylate as copolymerized units, and 20 parts of a copolymer of 80% of ethylene and 20% of butyl acrylate. The molding material shows no exudation of oil; it has a G-modulus of 6.1, a tensile strength of 6.1 and an elongation at break of 980.

EXAMPLE 6

The procedure followed is analogous to Example 2 except that instead of the propane asphalt 50 parts of a precipitated asphalt having a penetration of 1 and a softening point of 95°C (ring and ball) are employed. The molding material shows no exudation of oil; it has a G-modulus of 5.5, a tensile strength of 7.1 and an elongation at break of 820.

We claim:

1. A mixture comprising an ethylene copolymer and asphalt in a weight ratio of from 3 : 97 to 97 : 3, wherein the asphalt used is a precipitated asphalt which has a penetration, measured according to DIN 1,995, of from 0 to 8 at 25°C and a softening point, measured according to DIN 1,995 (ring and ball method), of from 50° to 85°C.

2. A mixture as claimed in claim 1 wherein the ethylene copolymer: asphalt weight ratio is from 30 : 70 to 70 : 30.

3. A mixture as claimed in claim 1 wherein the ethylene copolymer is a copolymer of ethylene and one or more comonomers selected from vinyl esters and copolymerizable acrylic and methacrylic compounds, containing from 3 to 70 per cent by weight of comonomer units.

4. A mixture as claimed in claim 1 wherein the ethylene copolymer has a melt index of 0.1 to 20.

5. A mixture as claimed in claim 1 also containing 5 to 70 per cent by weight of a particulate filler of particle size from 0.01 to 0.09 mm.

6. A mixture as claimed in claim 5 which also includes a mineral filler of particle size greater than 0.09 mm up to 20 mm.

7. A mixture as claimed in claim 5 which contains a fibrous filler.

* * * * *